July 13, 1948.　　　　G. STEINGRUBER　　　　2,445,250
AIR-CIRCULATING HEATER
Filed Feb. 4, 1946　　　　　　　　　　　　　3 Sheets-Sheet 1
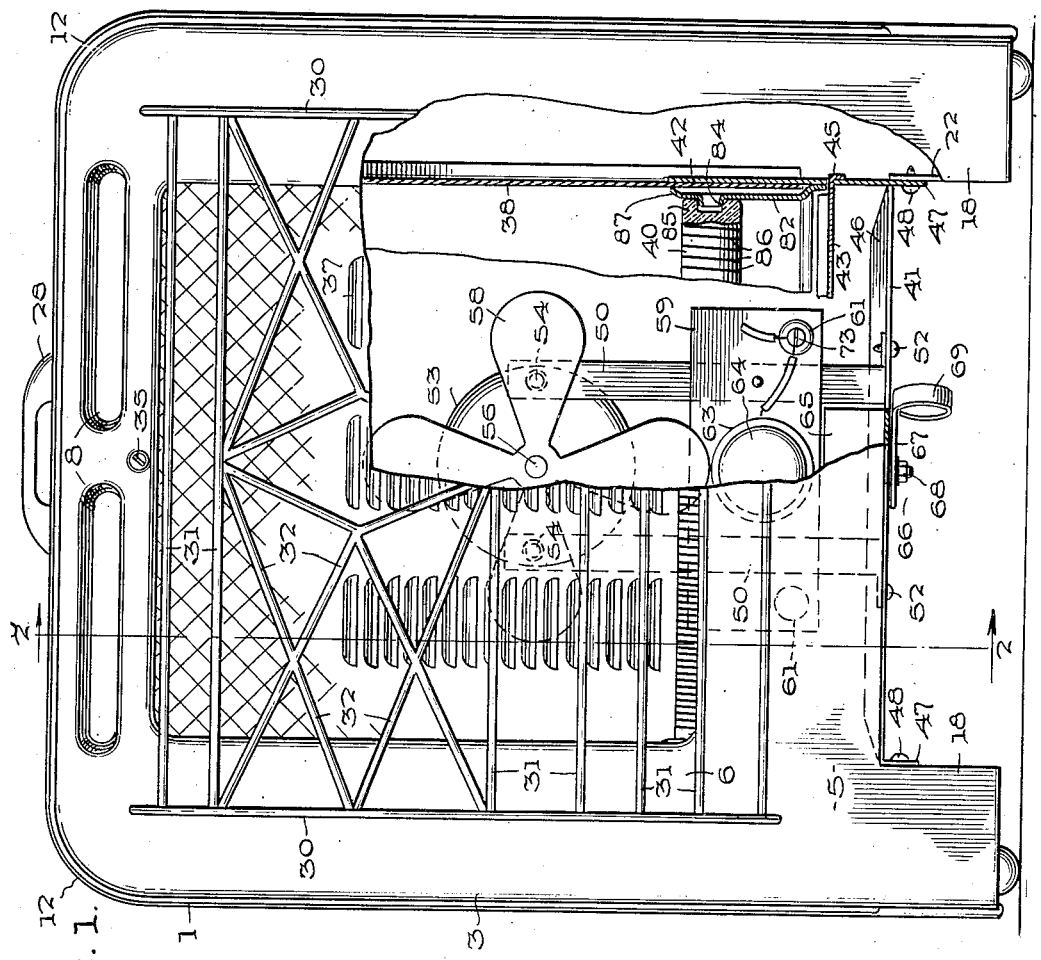
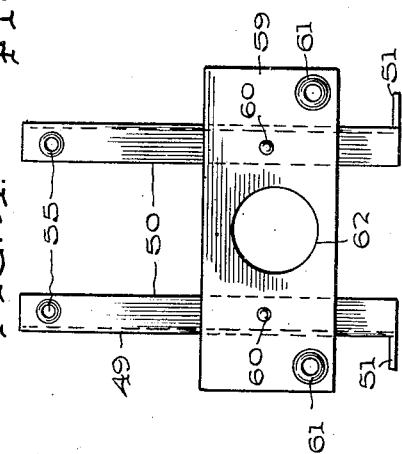
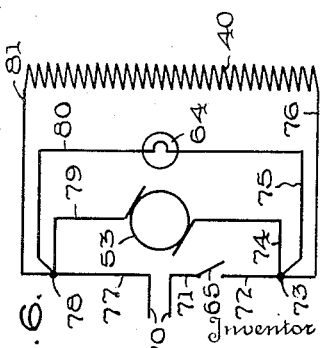
Inventor
G. Steingruber
By Robb & Robb
Attorneys

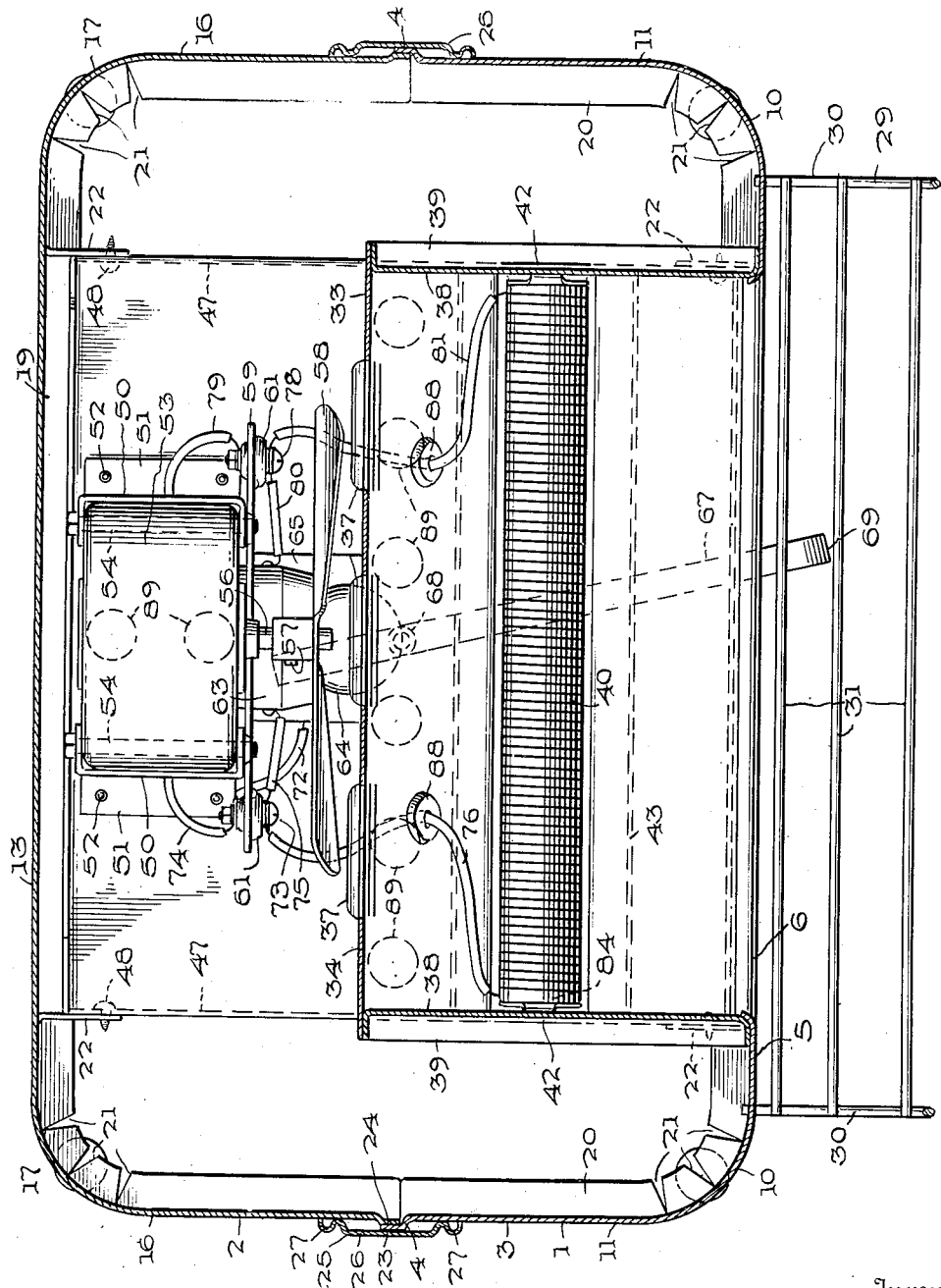

Patented July 13, 1948

2,445,250

UNITED STATES PATENT OFFICE 2,445,250

AIR-CIRCULATING HEATER

George Steingruber, Atlanta, Ga.

Application February 4, 1946, Serial No. 645,352

18 Claims. (Cl. 219—39)

The present invention relates to space heaters, and more especially to electric heaters of the portable type.

The primary object of the invention is to provide a portable, compact and efficient electric heater of improved construction, and which is neat and attractive in appearance, as well as simple in form, so as to be relatively inexpensive in cost of production and expense of operation.

In carrying out the foregoing general aims of the invention, my improved heater is so constructed as to utilize to maximum advantage the combination of reflected, radiated and circulated heat in such a manner as to produce a continuous flow of clean, warm air in sufficient volume as to be capable of heating a space of substantial size, such as a large room, with the heat diffused in all directions and effective at a substantial distance from the heater, thus avoiding what is commonly known as local or "spot" heating, where the effective heat is confined to a zone comparatively close to the heater, even with forced circulation of air, as in the case of many heaters heretofore available.

In addition to producing heat circulation by convection in substantial and effective volume, I also preferably provide for forced circulation of air through my heater by a power-driven fan which is so arranged as to prevent undue cooling of the electrical heating element which constitutes the source of heat.

A further object of the invention is to provide improved means for creating the illusion of an open flame as the source of heat in an electrical heater, said means enhancing the attractiveness of the heater when in use, and at the same time, serving as a visual indicator or signal that the heater is in operation, or the power is "on."

Another object of the invention is to provide a novel and improved heater casing or shell of sheet metal construction, together with a novel and improved assembly of elements within the casing, which together attain the objects aforementioned.

Other and further objects and advantages of the invention will be hereinafter described and the novel features thereof defined by the appended claims.

In the drawings—

Figure 1 is a view of a heater constructed in accordance with the present invention, said view being partly in front elevation and partly in section;

Figure 3 is a horizontal sectional view taken on the line 3—3 of Figure 2;

Figure 4 is a detail view in front elevation of the combined fan and lamp support;

Figure 5 is a top plan view of the support shown in Figure 4; and

Figure 6 is a wiring diagram of the electrical circuits of the heater assembly.

Figure 2:
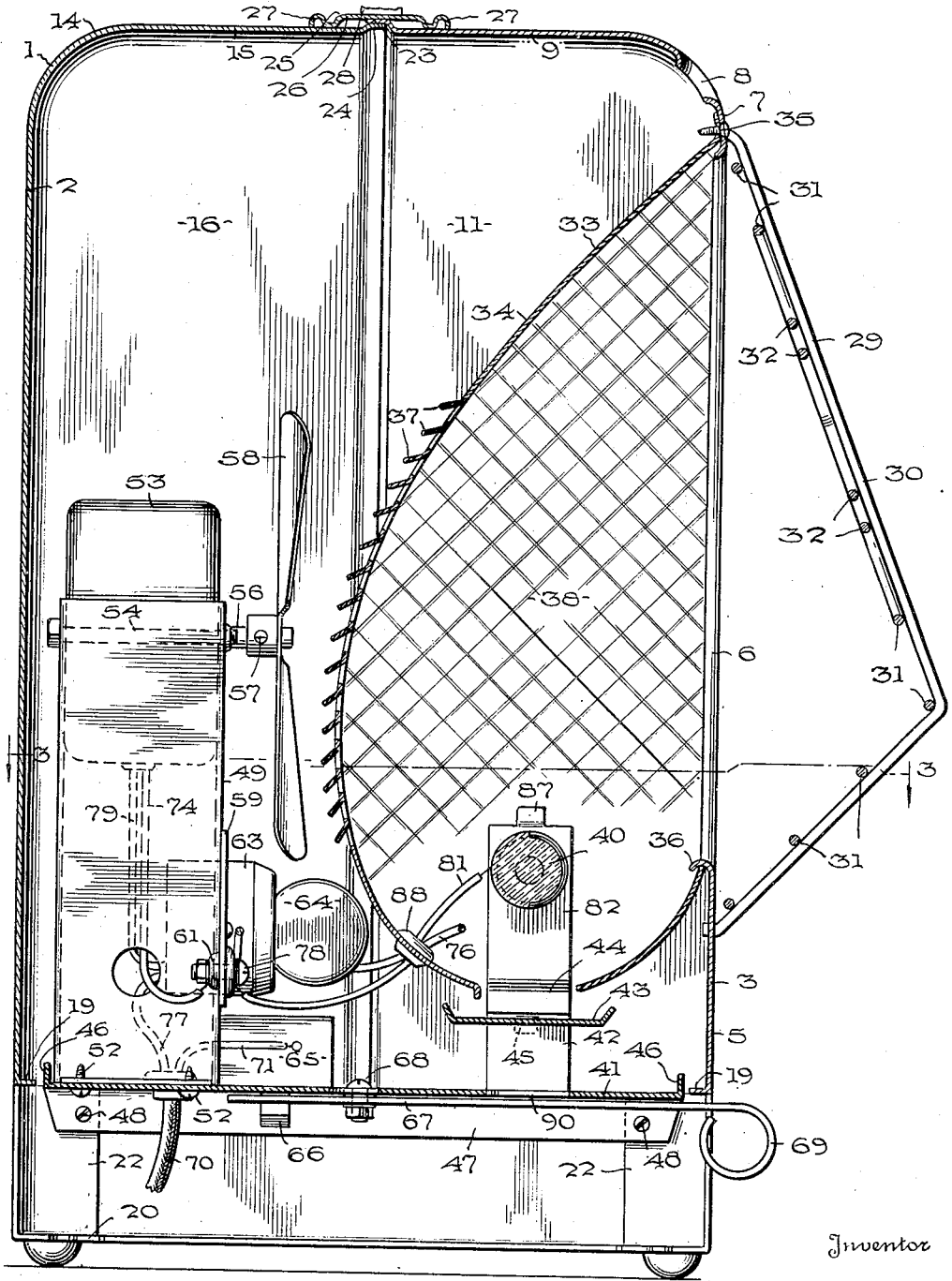
Figure 2 is a vertical sectional view on an enlarged scale, taken on the line 2—2 of Figure 1.

Like reference characters designate corresponding parts in the several figures of the drawings, wherein I denotes generally the outer casing or shell of the heater which is preferably constructed of sheet metal and is preferably made in two separate sections designated 2 and 3 respectively, the sections being joined together at a point about midway between the front and back of the heater, as indicated at 4. The front section 3 includes an upright front wall 5, in which there is provided a relatively large opening 6 of generally rectangular outline. Above this opening 6, the front wall 5 begins to curve rearwardly as at 7, and in this curved portion, there is formed one or more horizontally elongated slots or openings, two of which have been shown in the drawings for purposes of illustration, as indicated at 8, 8. Above these slots, the front section 3 of the shell I is extended rearwardly on a substantially horizontal flat plane, as at 9, this latter extension forming the top wall of the front section of the heater. If preferred, the openings 8, 8 may be provided in the top wall 9 beyond the curved portion 7.

At each side of the front wall 5, the wall is extended on a smooth curve, as at 10, 10, and continues rearwardly to form upright side walls 11, 11 which are joined to the top wall 9 by the curved portions 12, 12. These walls just described are all preferably formed in one piece, as by the practice of suitable stamping and pressing operations well known in the art of sheet metal construction. By virtue of the construction as above described, all sharp corners are eliminated from the heater shell, and the shell has a neat and attractive form.

The rear section 2 of the shell is practically a duplicate of the front section 3, except for the omission of the openings 6 and 8 from the rear section. This rear section includes the rear wall 13, having its upper end curved upwardly and forwardly, as at 14, and then extended forwardly in a horizontal plane to form the top wall 15. The opposite side walls 16, 16 of the rear section 2 curve rearwardly, as at 17, 17 to merge into the rear wall 13, and the upper ends of these side walls curve inwardly towards each other to merge into the top wall 15. Additional openings like 8, 8 may be provided in the top wall 15 if desired.

At the bottom of the shell or casing 1, the front and rear sections are downwardly extended at the opposite ends of the shell so as to form legs or supports 18, 18, these legs extending from front to back of the heater, and being of such height as to cause the central portion of the heater to be raised a substantial distance above the floor or other support on which the heater is adapted to be rested. As will be seen from the drawings, the legs are thus integral extensions of the front, side and rear walls respectively of the shell sections so that the outline of the shell in horizontal section is uniform all the way down to the extreme lower ends of the legs. The front and rear walls 5 and 13 respectively terminate at their bottom edges above the floor throughout the central portion of the heater lying between the legs 18, 18, and these lower edges of the front and rear walls are preferably provided with inwardly-turned, opposed flanges, as indicated at 19, 19, to stiffen these edges. The extreme lower edges of the casing at the bottom of the legs 18, 18 are also inwardly-turned to provide a continuous marginal flange 20, 20 extending from the inner front corner of each leg, across the front, thence rearwardly to the back of the heater shell, and then across the back to the inner rear corner of each leg, as best seen in Figure 3 of the drawings. At the rounded corners of the shell, these flanges 20, 20 may be suitably cut out or notched, as at 21, to allow for bending of the rounded corners of the shell. At the inner corners of each leg, the leg is provided with an upright flange extending from the front of the leg for a substantial distance rearwardly, and from the back of the leg for a substantial distance forwardly, as indicated at 22, these flanges lying substantially perpendicular to the front and rear faces of the shell.

In order to join the two sections 2 and 3 of the shell together, the marginal edges of the walls at the back of the front section and at the front of the back section, respectively, are suitably offset and flanged, as at 23, 24, with the flanges so arranged as to telescope snugly one into the other to form the joint or seam designated 4, previously referred to. This seam may be suitable welded, spot-welded, or otherwise securely and preferably permanently fastened together in any desired manner. Overlying the seam or joint 4 and suitably attached to the shell, as by spot-welding or otherwise, is a finishing strip or trim strip designated 25, the central portion of which is preferably flat, as indicated at 26, and the opposite edges thereof being preferably shaped in the form of beads 27, 27, which serve to stiffen the strip and enhance its appearance. The entire strip, or such portions thereof as may be desired, may be chromium-plated or otherwise finished off in a neat and attractive manner. When the trim strip is attached to the shell, the joint 4 is fully concealed.

Attached to the top of the heater shell midway between the opposite ends thereof is a handle 28 of any suitable form to facilitate carrying the heater from place to place. At the front of the heater and disposed over the large opening 6, there is provided a grille 29 of any desired form and configuration. The grille shown in the drawings is made up of relatively heavy wire or bar material, with the end bars 30, 30 extending downwardly from a point just above the upper edge of the opening 6 in the front wall 5 of the shell, these bars being attached to the shell at their upper and lower ends in any suitable manner, as by extending them through the front wall of the shell and upsetting or spreading the extreme ends at the inside of the wall. As will be best seen from Figure 2, the bars 30, 30 incline downwardly and outwardly from their upper ends to a point somewhat below the center of the opening 6, and thence continue in a reversely inclined direction to a point below the lower edge of the opening 6. Extending across the front of the heater between the bars 30, 30 is a series of horizontally-disposed parallel bars designated 31, between certain of which are arranged a series of inclined or cross bars 32. By this arrangement, the grille minimizes the danger of fire should the heater be inadvertently tipped over and the catching of garments afire should such garments come in contact with or get too close to the front of the heater. Other arrangements of bars may be used if preferred and may be utilized to enhance the attractiveness of the heater.

Disposed within the outer shell assembly 1 is an inner reflector shell 33, said reflector shell including a rear wall 34 which is suitably attached to the inside of the front wall of the outer shell at a point just above the opening 6 in the latter, in any suitable manner, as by a screw 35. The wall 34 of the reflector shell is inclined rearwardly and downwardly to a point adjacent to the bottom of the opening 6 in the outer shell, and thence continues downwardly and forwardly for a substantial distance below the bottom of the opening 6, from which latter point the reflector wall continues upwardly and forwardly to the front wall of the outer shell at the bottom edge of the opening 6, which bottom edge is inwardly flanged, as at 36, to engage over the bottom edge of the reflector shell. This rear wall 34 of the reflector shell is preferably provided with a plurality of rows of louvers 37, said louvers being struck out from the wall 34 and bent rearwardly at an acute angle to this reflector wall. While only three rows of louvers have been shown in the drawings, the number of rows, and the number of louvers in each row, may be increased or diminished as desired.

At the opposite edges of the rear wall 34 of the reflector shell, this wall is suitably joined to side walls 38, 38, lying just outside of the opposite vertical edges of the opening 6 in the front wall of the outer shell. The side walls 38, 38 of the reflector shell may be laterally flanged, as at 39, and these flanges may be suitably secured to the rear wall 34 as by spot-welding. These walls 34 and 38, 38 are preferably made of sheet metal having a high polish or other bright finish, such as a chromium finish, so as to serve as an efficient reflector surface. The walls are also preferably corrugated as illustrated by the intersecting diagonal lines, for the purpose of aiding the diffusion of the heat reflected by these walls from the heating element 40, which is disposed near the bottom of the reflector shell 33 and extends horizontally thereacross between the opposite side walls 38, 38 thereof at about the level of the lower edge of the opening 6 in the front wall of the outer shell 1.

The reflector shell 33 is attached in any suitable manner to a base plate 41, as by means of a pair of upright straps or plates 42, 42, which are preferably struck out of the base plate 41 and bent upwardly therefrom at the opposite ends thereof, said straps being spot-welded or otherwise secured to the outer faces of the walls 38, 38. Extending between the uprights 42, 42 and disposed horizontally below the bottom of the reflector shell 33 in spaced relation thereto is a baffle plate 43, said baffle plate lying directly below the heating element 40, and the bottom of the reflector shell being cut away to form a slot 44 through which air may enter the bottom of the reflector shell. The baffle plate 43 is provided at each end with a laterally-extended tongue 45, and each tongue is received through an opening in the upright 42 at the corresponding end of the baffle, and when so received, the tongue 45 is bent over against the outer face of the upright to rigidly secure the baffle in position between the uprights.

The base plate 41 is preferably turned upwardly at its front and rear edges so as to provide stiffening flanges 46, 46 along these edges. The opposite ends of the base plate are turned downwardly, as at 47, 47, to form flanges which are adapted to be secured to the leg flanges 22, by means of suitable removable fastenings or screws 48. From the foregoing description, it will be seen that by removing the screws 48 and the screw 35, the reflector shell, together with the base plate 41, may be removed as a unit from the outer shell of the heater. Such unitary construction facilitates assembly of the heater, and also removal of the reflector unit and heating element 40 from the outer shell for purposes of repair or replacement of the heating element, and such other parts of the assembly as will be hereinafter described.

Mounted on the base plate 41 at the back of the reflector shell 33 is a supporting frame generally designated 49, the details of which are best seen from reference to Figures 4 and 5. This frame includes a pair of laterally spaced channel members 50, 50 arranged in opposed relation to each other, and the lower edges of which are suitably flanged, as as 51, 51, so as to enable these channel members 50, 50 to be attached to the base plate 41 by screws or other suitable fastenings 52. At the upper end of the channel members 50, 50 of the supporting frame 49, and disposed therebetween is a motor 53, said motor being attached thereto in any suitable manner, as by means of tie-bolts 54 passing through the openings 55, 55 in the channel members 50, and through the motor casing or housing. The motor 53 is provided with a shaft 56 extending forwardly therefrom, and attached to the forward end of this shaft, as by means of a set screw 57, or other securing means, is a fan 58, the blades of which are located directly behind the louvers 37 in the rear wall 34 of the reflector shell 33.

Below the fan motor 53, and attached to the supporting frame 49, there is provided at the forward side of said frame a panel 59 having the form of a vertically arranged plate which is secured to the frame in any suitable manner, as by screws 60, 60. Adjacent to the outer lower corners of the panel 59, the panel is provided with apertured porcelain bushings 61, 61, and at the center of the panel, there is provided a large opening 62. Mounted in the opening 62 is a lamp socket 63 which may be of conventional form, said socket 63 having an electric lamp 64 mounted therein, and preferably of a red color. The lamp 64 is disposed below the louvers 37 so that the light rays from the lamp will be directed against the lower surfaces of the louvers and reflected forwardly through the reflector shell 33, thereby creating the illusion of an open flame when the heater is viewed from the front.

Mounted on the base plate 41 at the front of the supporting frame 49 and below the lamp 64 and its socket 63, is a switch unit 65 which may be of any conventional type, such as a toggle switch, and which includes a laterally shiftable switch button 66 which projects downwardly from the switch unit 65 when the switch unit is mounted on the base plate 41. The base plate is provided with an opening therein through which the switch button 66 projects, said opening being of a sufficient size to enable the switch button to be freely shifted in opposite directions. For the purpose of actuating the switch button 66, there is attached to the lower side of the base plate 41 an actuating lever 67 which is pivoted to the base plate for lateral movement about the axis of the bolt 68. The forward end of the actuating lever 67 is extended to the front of the heater and terminates in a handle 69 of any suitable form, said handle being rapidly accessible for manipulation of the switch button 66 by lateral movements imparted to the handle. The inner end of the actuating lever 67 is suitably engaged about the switch button 66 for establishnig an operative connection between the lever and the switch button.

The heating element 40, the fan motor 53, the lamp socket 63 with the lamp 64, and the switch unit 65 are all connected in an electrical circuit as diagrammatically illustrated in Figure 6 of the drawings. The heater is provided with an extension cord 70 which may be conveniently plugged into a suitable electrical outlet for connecting the heater to a source of power. One conductor 71 of the extension cord 70 is connected to one terminal of the switch unit 65, and the other terminal of the switch unit is connected by a conductor 72 to a terminal 73 attached to one of the insulating bushings 61 on the panel 59. From this terminal 73, additional conductors 74, 75 and 76 are connected to one side of the motor 53, the lamp 64 and the heating element 40, respectively. A second conductor 77 of the extension cord is connected to another terminal 78 mounted in the other insulating bushing 61 on the panel 59, and this terminal is in turn connected to the other side of the motor 53, the lamp 64 and the heating element 40, by conductors designated 79, 80 and 81 respectively. It will, accordingly, be understood that when the extension cord 70 is connected to the source of electrical power, and the switch button 66 is shifted in one direction so as to close the switch unit 65, the electrical energy will be simultaneously directed to the motor 53, the lamp 64, and the heating element 40 which are connected across the terminal 73, 78 in parallel circuits. By shifting the switch button 66 in the opposite direction, the power may be shut off as will be obvious. If desired, a separate switch (not shown) may be provided in the motor circuit so as to enable the motor to be started and stopped at will independently of the main switch unit 65.

As previously described, the heating element 40 is mounted in a substantially horizontal position between the opposite end walls 38, 38 of the reflector shell 33. Any suitable means may be utilized to support the heating element in this position, such supporting means being shown in the drawings in the form of plates or straps 82, 82 suitably attached at their lower ends to the respective uprights 42, 42, as by spot-welding.

Each of the plates 82 is inwardly offset and thence extends upwardly at the inside of the corresponding side wall 38 of the reflector shell 33, with the body of the plate 82 spaced inwardly from such side wall. Adjacent the upper end, each plate 82 is provided with an inwardly offset lug or boss 84 which may be struck out of the plate and which is adapted to be seated in the end of a hollow porcelain or fire-clay supporting member 85 upon which is wound the usual resistance wire 86 which produces the heat when energized. At the extreme upper end of each plate 82, the plate is provided with an ear 87 which may be bent outwardly into engagement with the inner face of the corresponding side 38 of the reflector shell 33, thereby firmly clamping the ends of the heating element 40 between the opposite plates 82, 82, while at the same time affording a substantial resiliency in the mounting of the heating element by virtue of the flexibility of the plates 82, 82 and side walls 38, 38, such resiliency minimizing damage to the heating element by rough handling of the heater, and allowing for expansion or elongation of the heating element as it reaches an operating temperature. The conductors 76 and 81 which lead from the opposite ends of the heating element 40 to the terminals 73 and 78 are threaded through suitable porcelain or other insulating bushings 88, 88 which are mounted in the back wall 34 of the reflector shell 33, near the bottom of this shell.

In order to facilitate the passage of air upwardly through the bottom of the heater, the base plate 41 is preferably provided with a series of openings 89, in addition to the openings 90 which are formed by the striking out of the uprights 42, 42 from the base plate.

In the operation of the heater above described, the power may be turned on by laterally shifting the switch actuating handle 69 which, when in the "on" position, energizes the fan motor 53, the lamp 64, and the heating element 40. A strong flow of air is drawn into the bottom of the heater, both by the action of the fan blades 58, as well as by induction due to convection. On passing upwardly through the openings in the base plate 41 at the bottom of the heater, the air enters the space within the outer shell or casing 1, said air space being located at the back of the reflector shell 33, as well as at the opposite sides of the latter. As the heater warms up to its normal operating temperature, the reflector shell 33 will be heated, and some of its heat will be directly reflected forwardly through the opening 6 at the front of the heater, and in addition, some of the heat will be given up to the air in the air space behind and at the opposite sides of the reflector shell. Some of the air from this air space will pass around the baffle 43 and through the opening 44 at the bottom of the reflector shell 33, into the reflector shell, where it will be directly heated by the heating element 40 before it is directed outwardly through the opening 6, the baffle 43 serving to prevent the air from passing too rapidly through opening 44 which would otherwise unduly cool the heating element 40, as well as prevent the air from being adequately heated before it is discharged at the front of the heater. As the air rises in the air space behind the reflector shell 33 as it is heated in this space, some of the air will be forced by the fan 58 through the louvers 37, and thence forwardly through the front of the heater, these louvers being so arranged as to prevent the air currents set up by the fan from being directed directly onto the heating element 40, which otherwise would also unduly cool the heating element and reduce it effectiveness. Other portions of the air will continue to rise in the air space behind the reflector shell, and will rise to the top where it will be discharged through the openings 8, 8 at the upper front corner of the heater. The several air currents which are discharged from the front of the heater are thus cumulative in effect and serve to produce a very effective supply of heat, with attending low cost of operation.

When the switch unit 65 has been actuated to its circuit-closing position by means of the actuator handle 69, the lamp 64 is energized, and the light rays therefrom will be reflected forwardly by the louvers 67 so as to produce a glow effect within the reflector shell 33, which glow effect, when viewed from the front of the heater, creates the illusion of an open flame. In addition, the lamp 64 serves as a signal indicating that the power is turned on, as determined by observation of the glow effect above referred to.

While the specific details of the invention have been herein shown and described, the invention is not confined thereto as changes and alterations may be made without departing from the spirit of the invention as defined by the appended claims.

I claim:

1. An electric heater of the class described, comprising an outer shell composed of front, back, side and top walls, said front wall having an opening therein, a reflector shell disposed within the outer shell, said reflector shell including vertical side walls spaced inwardly from the side walls of the outer shell, and a continuous back wall spaced from the back wall of the outer shell and joining the vertical side walls of the reflector shell, said back wall of the reflector shell curving downwardly and rearwardly from a point above the opening in the front wall of the outer shell, with the lower portion of the back wall curving downwardly and forwardly to a point below the opening aforesaid, and thence curving upwardly and forwardly towards the front wall of the outer shell and terminating at the bottom of the opening therein, an electric heating element horizontally disposed within the bottom of the reflector shell between the side walls of the latter, said reflector shell having an opening in the bottom thereof below the heating element for permitting air to enter the reflector shell and pass upwardly around the heating element to heat the air before discharge of the air forwardly through the opening in the front wall of the outer shell, a plurality of louvers formed in the curved back wall of the reflector shell above the heating element, and means disposed within the outer shell behind the reflector shell for forcing air entering at the bottom of the outer shell into the space between the outer shell and the reflector shell, through the louvers and outwardly through the opening at the front of the outer shell.

2. An electric heater as defined in claim 1, wherein the outer shell is provided with an air outlet at the upper end of the air space between the outer shell and the reflector shell, with the latter outlet disposed above the reflector shell.

3. A portable electric space heater, comprising an outer shell closed at its opposite sides, back and top, and provided with an opening of substantial area at its front, an inner shell having opposite sides and a continuous back disposed within the outer shell in spaced relation to the back, sides and top of the latter, and forming an air chamber between the inner and outer shells, said inner shell being open at the front and facing the opening at the front of the outer shell, an electric heating element disposed within the inner shell adjacent to the bottom thereof, said inner shell having an opening therein at the bottom thereof below the heating element, and other openings in the back thereof, to admit air into the inner shell on entering the bottom of the air chamber aforesaid, and means disposed in the air chamber for forcing at least some of the air through the openings in the back of the inner shell and forwardly through the opening at the front of the outer shell.

4. An electric heater as defined in claim 3, wherein the outer shell is provided with an opening above the inner shell for discharging air from the top of the air chamber.

5. An electric heater as defined in claim 3, wherein the outer and inner shells are formed of sheet metal, and the outer shell is formed of separate front and rear sections which are united along a telescopically overlapping seam extending upwardly at the opposite sides and across the top thereof.

6. An electric heater as defined in claim 3, wherein the outer and inner shells are formed of sheet metal, and the outer shell is formed of separate front and rear sections which are united along a telescopically overlapping seam extending upwardly at the opposite sides and across the top thereof, and the seam is concealed by a trim-strip overlying the same.

7. An electric heater as defined in claim 3, wherein the outer and inner shells are formed of sheet metal, and the outer shell is formed of separate front and rear sections, the marginal edges of which are flanged for telescopic engagement with each other, forming a seam extending upwardly at the opposite sides of the outer shell and across the top thereof.

8. An electric heater as defined in claim 3, wherein the openings in the back of the inner shell have the form of louvers struck out therefrom and projecting rearwardly into the air chamber.

9. An electric heater as defined in claim 3, wherein the openings in the back of the inner shell have the form of louvers struck out therefrom and projecting rearwardly into the air chamber at an acute angle to the rear wall of the inner shell.

10. An electric heater as defined in claim 3, wherein the openings in the back of the inner shell have the form of a plurality of horizontally-disposed louvers arranged in a plurality of vertical rows laterally spaced from each other.

11. An electric heater as defined in claim 3, wherein the openings in the back of the inner shell have the form of a plurality of horizontally-disposed louvers arranged in a plurality of vertical rows laterally spaced from each other, and the means for forcing the air through the back of the inner shell comprises a motor-driven fan disposed directly behind the louvers.

12. An electric heater as defined in claim 3, wherein the openings in the back of the inner shell have the form of a plurality of horizontally-disposed louvers arranged in a plurality of vertical rows laterally spaced from each other, and the means for forcing the air through the back of the inner shell comprises a motor-driven fan disposed directly behind the louvers, with the louvers arranged at such inclinations as to prevent the air from blowing directly onto the heating element.

13. An electric heater as defined in claim 3 wherein the openings in the back of the inner shell have the form of louvers struck out therefrom and projecting rearwardly into the air chamber, in combination with a lamp disposed within the air chamber behind the inner shell and below the louvers so that light rays from the lamp will be directed onto the louvers and reflected into the inner shell through the back thereof, said inner shell and louvers having at least their inner surfaces provided with reflecting surfaces.

14. An electric heater as defined in claim 3, wherein the openings in the back of the inner shell have the form of louvers struck out therefrom and projecting rearwardly into the air chamber, and the means for forcing the air through the openings comprises a motor-driven fan disposed in the air chamber behind the inner shell and directly behind the louvers aforesaid, in combination with a lamp disposed within the air chamber behind the inner shell and below the louvers so that light rays from the lamp will be directed onto the louvers and reflected into the inner shell through the back thereof, said inner shell and louvers having at least their inner surfaces provided with reflecting surfaces, and means for connecting the motor of the motor-driven fan, the lamp, and the heating element, in circuit for simultaneous operation.

15. An electric heater as defined in claim 3, wherein the openings in the back of the inner shell have the form of louvers struck out therefrom and projecting rearwardly into the air chamber, and the means for forcing the air through the openings comprises a motor-driven fan disposed in the air chamber behind the inner shell and directly behind the louvers aforesaid, in combination with a lamp disposed within the air chamber behind the inner shell and below the louvers so that light rays from the lamp will be directed onto the louvers and reflected into the inner shell through the back thereof, said inner shell and louvers having at least their inner surfaces provided with reflecting surfaces, and means for connecting the motor of the motor-driven fan, the lamp, and the heating element, in circuit for simultaneous operation, said circuit means including a switch for opening and closing the circuit at will.

16. An electric heater as defined in claim 3, wherein the openings in the back of the inner shell have the form of louvers struck out therefrom and projecting rearwardly into the air chamber, and the means for forcing the air through the openings comprises a motor-driven fan disposed in the air chamber behind the inner shell and directly behind the louvers aforesaid, in combination with a lamp disposed within the air chamber behind the inner shell and below the louvers so that light rays from the lamp will be directed onto the louvers and reflected into the inner shell through the back thereof, said inner shell and louvers having at least their inner surfaces provided with reflecting surfaces, and means for connecting the motor of the motor-driven fan, the lamp, and the heating element, in circuit for simultaneous operation, said circuit means including a switch for opening and closing the circuit at will, and switch actuating means accessible from the front of the heater.

17. A portable electric space heater, comprising an outer shell closed at its opposite sides, back and top, and provided with an opening of substantial area at its front, an inner shell disposed within the outer shell in spaced relation to the back, sides and top of the latter, and forming an air chamber between the inner and outer shells, said inner shell being open at the front and facing the opening at the front of the outer shell, an electric heating element disposed within the inner shell adjacent to the bottom thereof, said inner shell having an opening therein at the bottom thereof below the heating element, and other openings in the back thereof, to admit air into the inner shell on entering the bottom of the air chamber aforesaid, a motor-driven fan for forcing at least some of the air through the openings in the back of the inner shell and forwardly through the opening at the front of the outer shell, said openings in the back of the inner shell having the form of louvers struck out therefrom and extending rearwardly into the air chamber, a lamp disposed in the air chamber behind the inner shell and below the louvers so that the light rays from the lamp will be directed into the inner shell, and a base plate horizontally disposed in the bottom of the outer shell below the inner shell and attached to the latter and to the outer shell, said base plate constituting a common support for the motor-driven fan and the lamp aforesaid.

18. A portable electric space heater, comprising an outer shell closed at its opposite sides, back and top, and provided with an opening of substantial area at its front, an inner shell disposed within the outer shell in spaced relation to the back, sides and top of the latter, and forming an air chamber between the inner and outer shells, said inner shell being open at the front and facing the opening at the front of the outer shell, an electric heating element disposed within the inner shell adjacent to the bottom thereof, said inner shell having an opening therein at the bottom thereof below the heating element, and other openings in the back thereof, to admit air into the inner shell on entering the bottom of the air chamber aforesaid, a motor-driven fan for forcing at least some of the air through the openings in the back of the inner shell and forwardly through the opening at the front of the outer shell, said openings in the back of the inner shell having the form of louvers struck out therefrom and extending rearwardly into the air chamber, a lamp disposed in the air chamber behind the inner shell and below the louvers so that the light rays from the lamp will be directed into the inner shell, and a base plate horizontally disposed in the bottom of the outer shell below the inner shell and attached to the latter and to the outer shell, said base plate constituting a common support for the motor-driven fan and the lamp aforesaid and having a plurality of openings therein for admitting air therethrough upwardly into the air chamber thereabove.

GEORGE STEINGRUBER.

REFERENCES CITED

The following references are of record in the file of this patent:

UNITED STATES PATENTS

| Number | Name | Date |
| --- | --- | --- |
| 1,406,912 | Theofilos | Feb. 14, 1922 |
| 1,829,303 | Schaber | Oct. 27, 1931 |
| 1,908,559 | Roser | May 9, 1933 |
| 1,942,758 | Jessup | Jan. 9, 1934 |
| 1,986,350 | Logan | Jan. 1, 1935 |
| 1,998,670 | Goshorn et al. | Apr. 23, 1935 |
| 2,131,484 | Ringwald | Sept. 27, 1938 |
| 2,372,832 | Jepson | Apr. 3, 1945 |

FOREIGN PATENTS

| Number | Country | Date |
| --- | --- | --- |
| 274,615 | Great Britain | July 28, 1927 |